Jan. 19, 1937. E. L. SCHELLENS Re. 20,250

LOCOMOTIVE

Original Filed June 27, 1932 3 Sheets-Sheet 1

INVENTOR
Eugene L. Schellens
BY
Symmetwatt & Lechner
ATTORNEYS

Jan. 19, 1937. E. L. SCHELLENS Re. 20,250

LOCOMOTIVE

Original Filed June 27, 1932 3 Sheets-Sheet 2

INVENTOR
Eugene L. Schellens
BY
Symmetwolt & Lechner
ATTORNEYS

Jan. 19, 1937. E. L. SCHELLENS Re. 20,250

LOCOMOTIVE

Original Filed June 27, 1932 3 Sheets-Sheet 3

INVENTOR
Eugene L. Schellens
BY
Synnestvedt & Lechner
ATTORNEYS

Reissued Jan. 19, 1937

Re. 20,250

UNITED STATES PATENT OFFICE 20,250

LOCOMOTIVE

Eugene L. Schellens, Ridgewood, N. J., assignor to C-S Engineering Company, Englewood, N. J., a corporation of Delaware Application June 27, 1932, Serial No. 619,458. Divided and application June 8, 1933, Serial No. 674,793. Patent No. 2,017,134, dated October 15, 1935. This application for reissue December 7, 1935, Serial No. 53,439

9 Claims. (Cl. 110—122)

This invention relates to locomotives, and is primarily concerned with the separation of cinders and other solids from the flue gases, and the provision of simple structure, readily applied to existing equipment, which will accomplish this function in such manner as to enhance the efficiency of the draft and of the locomotive as a whole.

This application is a division of my copending application Serial No. 619,458, filed June 27, 1932.

Present standard "front ends" such as the "master mechanic's front end", which were satisfactory heretofore, are found to have limitations of such character that they do not meet the increased demands thereon brought about by the increased efficiency of the locomotives.

It is to improvements in this part of locomotives that this invention is directed, and I aim to increase locomotive efficiency through the provision of improvements in front ends and associated mechanisms.

My solution of the front end problem differs from previous methods of approach in that it radically departs from the functional operation of the generally accepted front end constructions by entirely eliminating the necessity of grinding the cinders into particles small enough to pass through the screen for stack discharge. In order to properly grind up the cinders and pass them through the screen or netting in these prior constructions, very high velocities are employed, with the result that the cinders come in contact with the netting a number of times and thus cause considerable wear of the netting, as well as of the smoke box ring, cover, stack and other parts. The cinders discharged through the stack have a high fuel value, and therefore a wastage of fuel exists.

In such front ends, it is necessary that all gases pass through restricted areas under a table plate and diaphragm. The energy thus consumed is a large percentage of the energy required to draft the locomotive and, in fact, approximately thirty per cent. of draft energy is consumed through cinder handling and throttling due to restricted passages. This additional energy is obtained only by a corresponding increase in back pressure.

Among the advantages to be obtained through the practice of my invention are increased draft efficiency, operation with lower back pressure for the same draft, elimination of smoke, and increased life of the front end parts.

The cinders are handled in a manner such that they gravitate to the bottom of the front end, from whence they are returned to the fire box and burned therein, so that a considerable saving of fuel is effected. Furthermore, the arrangement is such that there is substantially no loss of draft and therefore no additional energy is required. This results in a corresponding reduction in back pressure.

I also propose to employ a front end structure of such shape that the cinders move in a direction tangentially along the screen rather than against it whereby wear on the screen is very materially reduced.

I also provide an arrangement whereby any water which drips from the stack is drained into a water-tight well or container surrounding the exhaust pipe of the locomotive, so that as the smoke box becomes hot the water evaporates. Through this arrangement, plugging of the netting is avoided. In this connection it is pointed out that in constructions such as heretofore employed there is considerable drip from the stack under certain operating conditions which falls on the table plate, netting, or both, and often causes wetting of the cinders and netting to such an extent that very objectionable soot is formed.

The primary object of my invention is to overcome difficulties such as mentioned above and to increase the efficiency of locomotives and railroad operation in general.

How the foregoing, together with such other objects and advantages as may hereinafter appear or are incident to my invention are realized, is illustrated in preferred form in the accompanying drawings, wherein—

Figure 1:
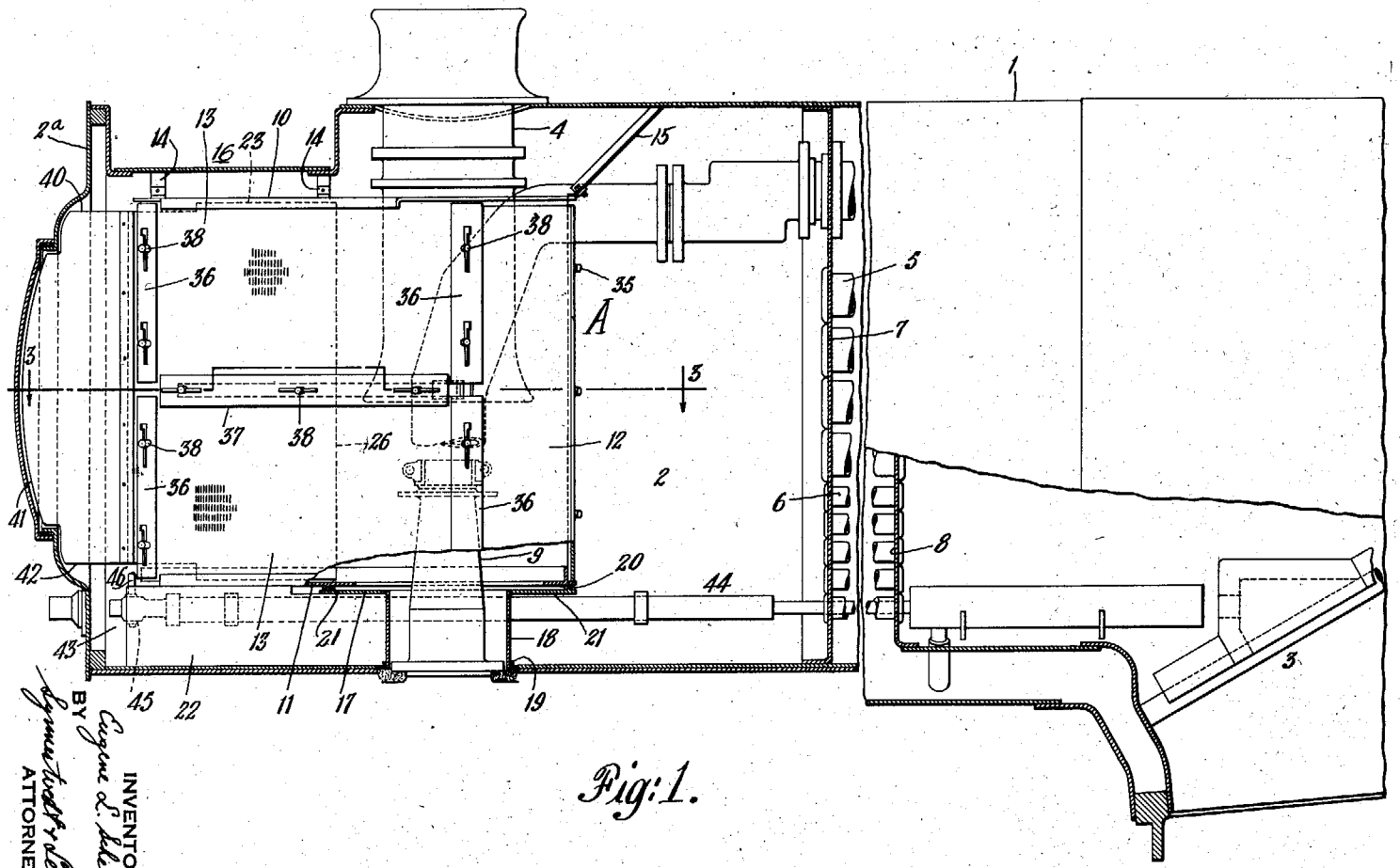
Figure 1 is a vertical longitudinal section through a locomotive front end construction embodying my invention, and also illustrates the fire box portion of the locomotive. Certain portions of the view are broken out in order to condense the figure, and certain of the parts appear in elevation.

Figure 1 shows the front end and fire box construction of a locomotive having a boiler 1, smoke box 2, smoke box cover 2a, fire box 3, stack 4, flues 5 and 6, forward flue sheet 7, rear flue sheet 8, and exhaust nozzle 9.

My improved front end construction includes a unit A associated with the stack 4 and exhaust nozzle 9, it being pointed out that the lower stack extension extends well down into the unit A and that the exhaust nozzle 9 extends well up therein. Thus proper coordination of the stack extension and nozzle tip is afforded.

The unit A comprises a top plate 10, a bottom plate 11, a pair of curved back plates 12, and side screens 13, in this instance two screens being illustrated as making up each side. The top plate 10 is supported from the smoke box casing by means of suitable supports 14 and 15.

The particular form of smoke box 2 illustrated is provided with an arcuate recess 16 adjacent the stack for receiving a feed water heater or the like, and the disposition of the unit A surrounding the stack is such that the gas flow area between said unit and said recessed portion is approximately equal to or is greater than the flue area of the locomotive. In instances where the smoke box is provided with a flat heater recess at the top, this serves as a convenient surface for the attachment of the top plate of the unit A.

The bottom plate 11 is positioned on an adapter plate 17 which is secured with a water-tight joint, as by means of welding, to an adapter member 18 located in surrounding relation to the exhaust nozzle 9. The adapter member 18 is secured in place in the smoke box as by means of welding at 19, so as to form a water-tight connection. The adapter member 18 and its plate 17 provide a means sealed from the cinder passages for collecting water drip from the stack. The drip is caught by the plate 17 and drains into the water-tight well or pocket formed by the member 18, where it is evaporated. This arrangement avoids wetting of the cinders by stack drip. The adapter plate 17 is provided with an upstanding annular flange 20, and the bottom plate 11 is provided with a depending annular flange 21 which fits inside of the flange 20. A bottom dividing plate 22 extending along the center line of the smoke box is located between the bottom plate 11 and the lower wall of the smoke box and extends from the front edge of the unit A to the adapter member 18. This dividing member may be tack-welded to the smoke box and the adapter member 18.

An upper dividing plate 23 also extending along the center line of the smoke box is located between the top and bottom plates 10 and 11, and may be secured in place as by means of key and pin devices 24, and may be braced by means of braces 25. This dividing plate extends from the front edge of the unit A to a point 26 spaced somewhat from the stack 4.

Vertical frame members 27 extending from the top to the bottom plate, and horizontal frame members 28 extending from the vertical frame members to the front edge of the unit, are provided, the vertical frame members being secured to the top and bottom plates as by means of pin and key devices 29 and the horizontal members being secured at one end to the vertical members as by means of keys 30, and at their other ends to suitable structure 31 associated with the dividing plate 23 by means of pin and key devices 32.

The curved back plates 12, which together form a semi-circular wall, are attached at their free ends to the vertical frame members 27 through the medium of cooperating lugs 33 adapted to receive pin and key devices 34, the two curved members 12 being attached together as by means of hook devices 35. The sections or panels of the side screens 13 are secured in place by means of curved vertical strips 36 and curved horizontal strips 37, the strips 36 and 37 serving to clamp the screen panels against the vertical frame members 27, the horizontal frame members 28 and the structure 31, which is carried at the dividing plate 23. The clamping is effected by means of pin and key devices 38. It is to be noted that the top edge portions of the upper screen panels rest against flanges 39 provided on the top plate 10, and that the lower edge portions of the bottom screen panels rest against similar flanges provided on the bottom plate 11.

A dividing plate extension 40 is secured to the front edge portion of the dividing plate 23 and has its front edge configured to conform with the inside of the front smoke box cover, a slight space 41 being provided between the front edge of the plate and the inside surface of the smoke box cover. This extension may be secured to the dividing plate 23 by means of bolts and double nuts.

It will be noted that the dividing plates 22 and 23 and the extension 40 serve to divide the front portion of the smoke box into halves, in which cinders collect. These plates also function to prevent cross-currents from one side or half of the smoke box to the other, so that no eddies or vortexes are set up. I have found that this latter function, together with the action of the curved baffle plates 12, results in several important advantages,—first, improved draft efficiency due to elimination of eddies and second, improved steaming and heat transfer due to more uniform distribution of draft between the flue tubes. More specifically, these baffle arrangements prevent concentration of the draft in the central tubes. In addition to increased efficiency as a result of elimination of eddies and vortexes, this elimination also reduces objectionable churning around of the cinders. I prefer to have the bottom edge 42 of the extension 40 located at a point somewhat above the bottom wall of the smoke box, so that a relatively small opening 43 is provided at the bottom through which cinders may pass from one half of the smoke box to the other half.

Figure 2:
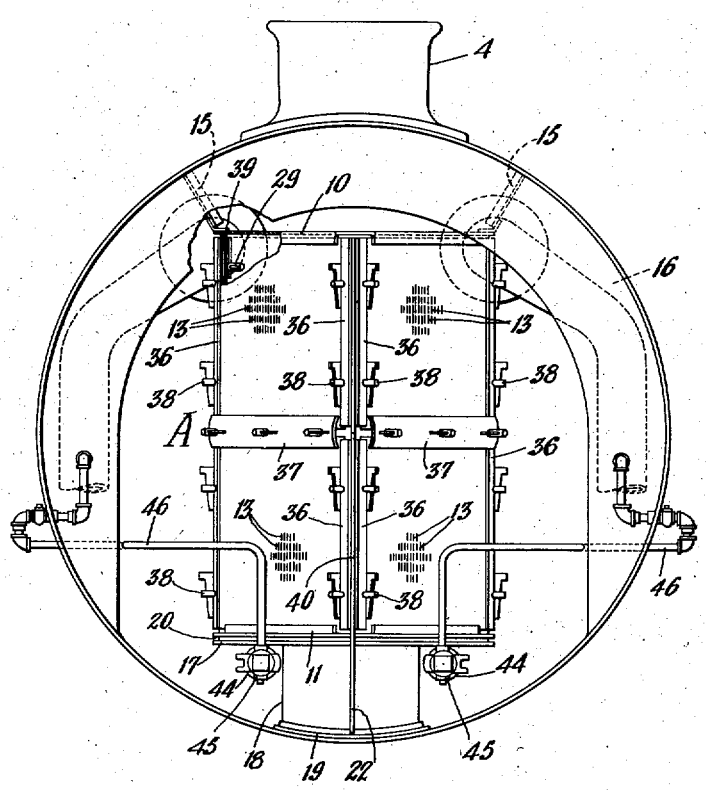
Figure 2 is a front elevational view with the front end cover removed.

Referring particularly to Figure 2, it will be seen that the size of the unit A is such that comparatively large and unrestricted passages are provided at each side thereof for the free passage of the gases and cinders, so that low velocity operation is obtained. The cross-sectional area of these passages may be from one hundred and fifty percent to two hundred percent of the flue area.

Figure 3:
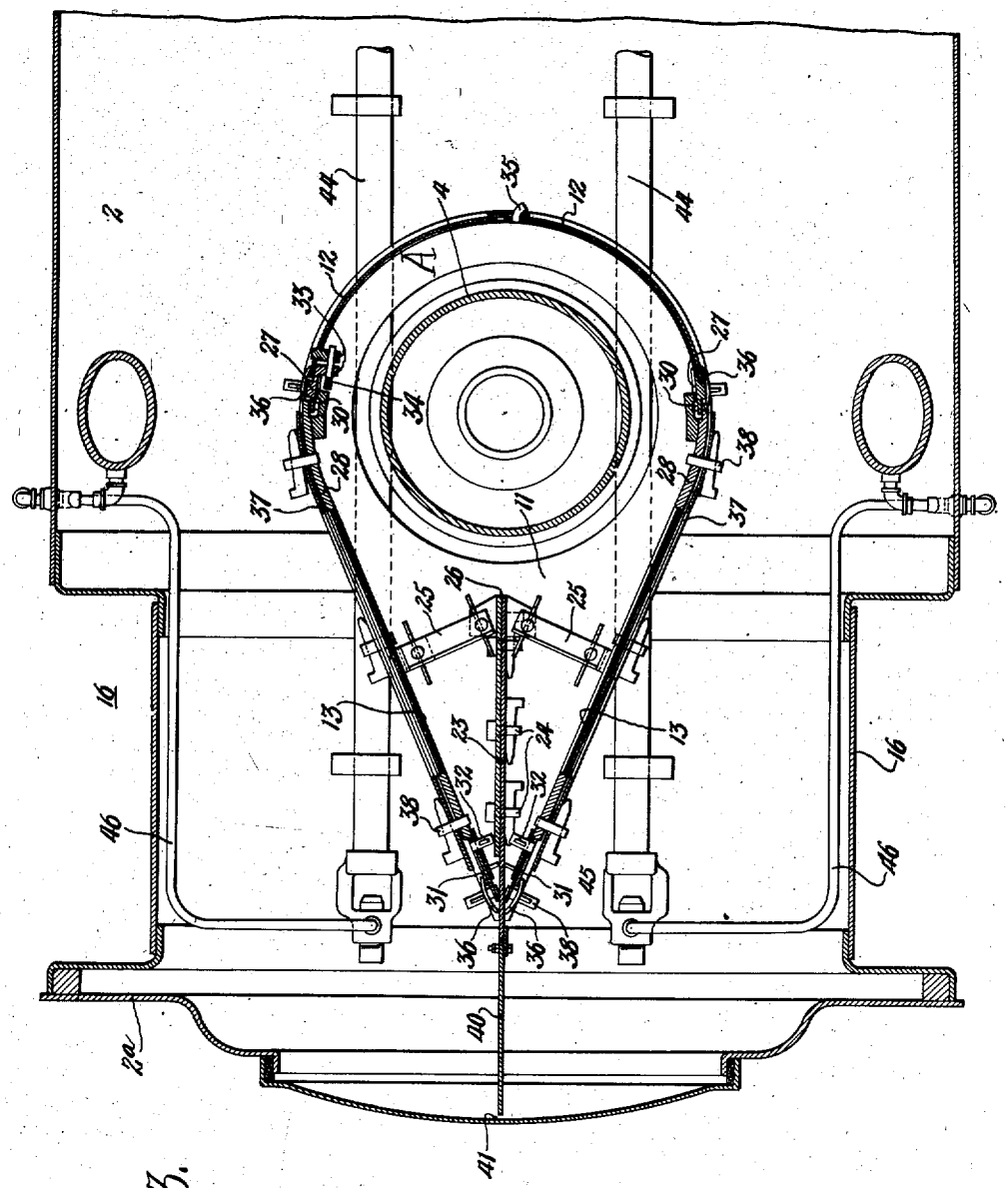
Figure 3 is an enlarged plan section taken substantially on the line 3—3 of Figure 1.

As will be seen from inspection of Figure 3, the rounded back wall and the side screens arranged in the form of a V cooperate to provide a device of such shape that the cinders move in a direction tangentially along the screen rather than against it. Stated in another way, the unit A is of tear-drop shape in horizontal cross section with the blunt end toward the flue sheet 7, or it may be said to be of generally oval shape in horizontal cross section with the long axis extending horizontally of the locomotive. This construction of the unit goes hand in hand with the low velocities in increasing the effectiveness of the device.

The unit A may be readily applied to existing smoke boxes, since it merely replaces the conventional type of netting and baffles. The unit is readily assembled due to its simplicity of construction involving removable plates conveniently joined together by strips and key devices.

In the lower portion of the smoke box and to each side of the unit A, a pair of cinder return pipes 44 are located which extend from the smoke box to the fire box and are straight from their entrance ends to their exit ends and extend through lower flues 6 of the locomotive boiler.

An ejector device 45 is associated with each cinder return pipe 44 at its entrance or smoke box end and operating steam is led thereto as by means of pipes 46. Cinders collecting in the lower portion of the smoke box are thus ejected through the cinder return pipes into the fire box, where they are consumed.

No specific claim is made herein to the cinder return mechanism and fire box or rear end construction as claims directed thereto form part of the subject matter of my copending application Serial No. 619,458, filed June 27, 1932, of which this application is a division.

I claim:

1. In a locomotive having a smoke box and stack, the combination of a cinder separating device in said smoke box in complete surrounding relation to the stack inlet and having a screened opening through which gases must pass to enter the stack, an imperforate bottom wall for said device, and a well connected with said bottom and secured to the smoke box wall with leakproof connection, said well having communication with the interior of said device for the collection of stack drip.

2. In a locomotive having a smoke box and smoke stack, the combination of a generally upright screen device in the smoke box in complete surrounding relation to the smoke stack inlet opening, including a top plate and an imperforate bottom plate supported from the smoke box, a plurality of upright panels, means for detachably securing said panels together to form a shell extending from the bottom plate to the top plate, and means for collecting stack drip including a drip chamber having communication with the interior of the screen device and having sealed connection with an adjacent portion of the smoke box and the bottom plate of the screen device to guard against drip leakage into the smoke box.

3. In a locomotive having a smoke box, a smoke stack and an exhaust nozzle, the combination of a generally upright separating device in the smoke box in complete surrounding relation to the smoke stack inlet and exhaust nozzle outlet and having an inlet for smoke box gases, an imperforate bottom for said device spaced above the adjacent bottom wall portion of the smoke box and a water-tight well having communication with the interior of the separating device for collecting stack drip, said well being in surrounding relation to the exhaust nozzle and extending from the bottom of the separating device to the adjacent bottom wall portion of the smoke box.

4. A locomotive having a smoke box, a smoke stack and an exhaust nozzle, the combination of a generally upright separating device in the smoke box in complete surrounding relation to the smoke stack inlet and exhaust nozzle outlet and having an inlet for smoke box gases, an imperforate bottom for said device spaced above the adjacent bottom wall portion of the smoke box and a water tight well having communication with the interior of the separating device for collecting stack drip, said well being in surrounding relation to the exhaust nozzle and extending from the bottom of the separting device to the adjacent bottom wall portion of the smoke box, together with means providing a seal for said well at the separating device and at the smoke box.

5. In a locomotive, cinder separating means including a smoke box, a smoke stack, an exhaust nozzle, a screen device through which smoke box gases must pass to enter the stack, said screen device including an upright shell having an imperforate rear curved portion in surrounding and spaced relation to the stack inlet opening and a perforate forward portion arranged in the form of a V, an imperforate bottom wall, a cylindrical portion extending downwardly from the bottom wall and disposed in surrounding relation to said nozzle for collecting stack drip, means forming a sealed connection between said cylindrical portion and bottom wall, and means forming a sealed connection between said cylindrical portion and the adjacent portion of the smoke box wall.

6. In a locomotive having a boiler with flue tubes, a smoke-box into which the tubes discharge, and a stack having its inlet end extending well downwardly into the smoke-box, partition means in the smoke-box for controlling flow of gases in the smoke-box from the discharge ends of said tubes to the inlet opening of the stack, the partition means including a substantially semi-cylindrical baffle having a radius larger than that of the stack and positioned substantially concentrically of the stack around the rear portion thereof, and the partition means further including an upright division wall extending from the front closure of the smoke-box rearwardly and centrally toward the stack, and said baffle and said wall both being of such vertical dimension as to extend materially above and below the horizontal level of the stack inlet opening.

7. In a locomotive having a boiler with flue tubes, a smoke-box into which the tubes discharge, and a stack having its inlet end extended well downwardly into the smoke-box, partition means positioned around the rear portion of the stack in the path of flow of gases from the tubes toward the stack dividing said flow into two streams one at each side of the stack, and additional partition means extending from the front closure of the smoke-box rearwardly toward said stack, the said additional partition means being extended materially above and below the stack inlet opening whereby to prevent substantial intercommunication of said streams forward of the stack inlet opening.

8. In a locomotive having a boiler with flue tubes, a smoke-box into which the tubes discharge, and a stack having its inlet end extending well downwardly into the smoke-box, partition means in the smoke-box for controlling flow of gases in the smoke-box from the discharge ends of said tubes to the inlet opening of the stack, the partition means including a substantially semi-cylindrical baffle having a radius larger than that of the stack and positioned substantially concentrically of the stack around the rear portion thereof, and the partition means further including an upright division wall extending from the front closure of the smoke-box rearwardly and centrally toward the stack, and said baffle and said wall both being of such vertical dimension as to extend materially above and below the horizontal level of the stack inlet opening, and a pair of generally upright screens with their forward edges juxtaposed at opposite sides of said partition means at a point forward of the stack and with their rear edges adjacent the sides of the semi-cylindrical baffle.

9. In a locomotive having a boiler with flue tubes, a smoke-box into which the tubes discharge, and a stack having its inlet end extended well downwardly into the smoke-box, partition means positioned around the rear portion of the stack in the path of flow of gases from the tubes toward the stack dividing said flow into two streams one at each side of the stack, additional partition means extending from the front closure of the smoke-box rearwardly toward said stack, the said additional partition means being extended materially above and below the stack inlet opening whereby to prevent substantial intercommunication of said streams forward of the stack inlet opening, and a pair of upright screens extended forwardly and inwardly from the side edges of the first partition means to the said additional partition means.

EUGENE L. SCHELLENS.